Aug. 24, 1965 H. A. FROMSON ETAL 3,201,861
METHOD OF MAKING A DOUBLE-WALLED TUBE
Filed March 31, 1960 5 Sheets-Sheet 1
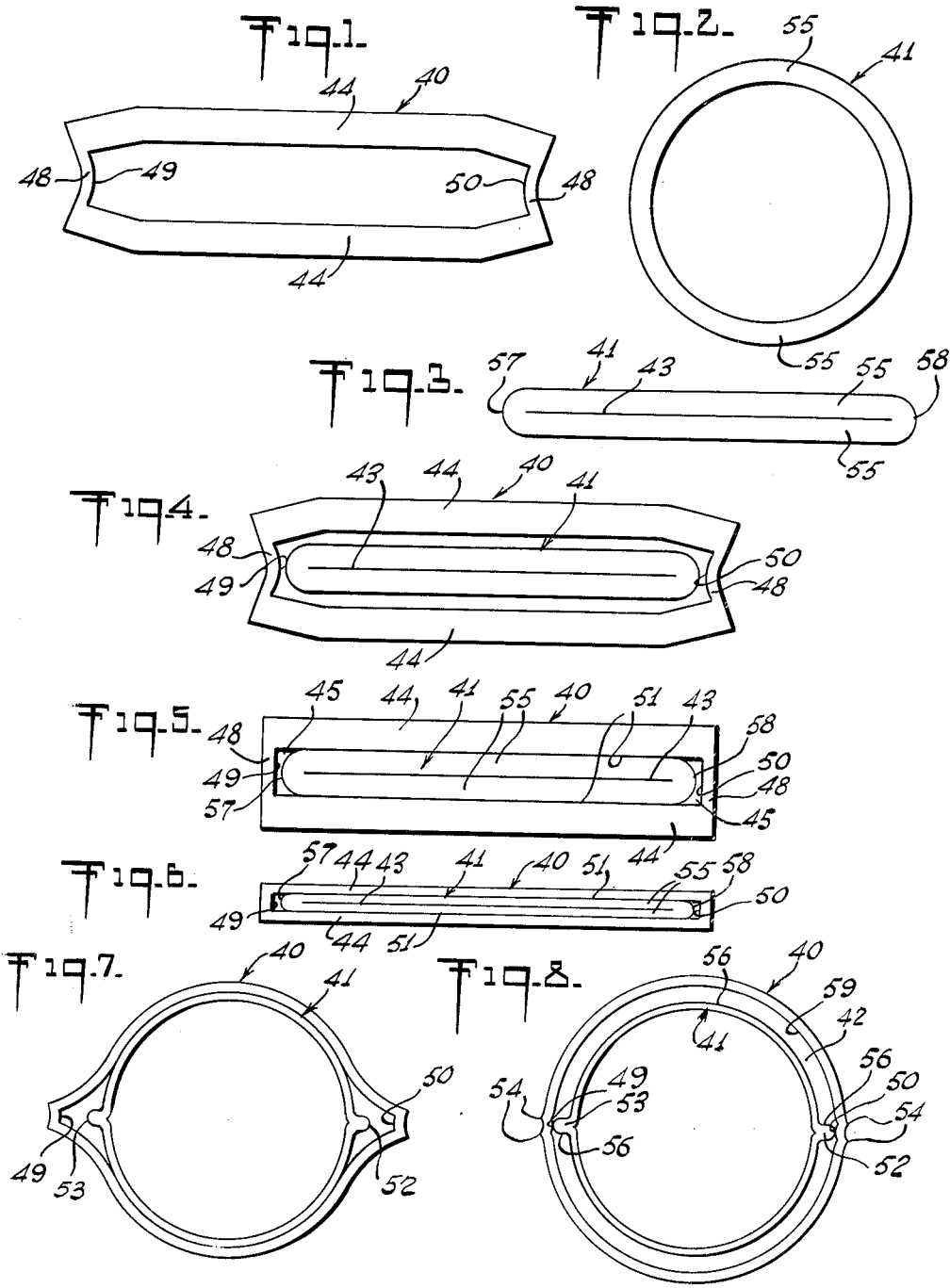
INVENTORS
HOWARD A. FROMSON
WILLIAM B. RYAN
BY
Burgess, Ryan, & Hicks
ATTORNEYS

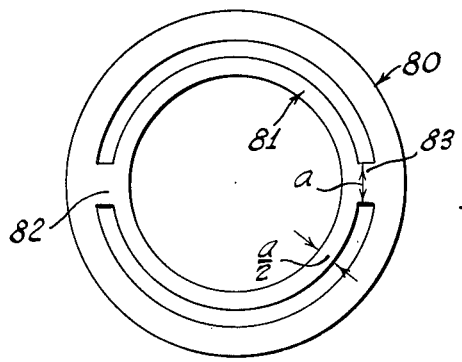
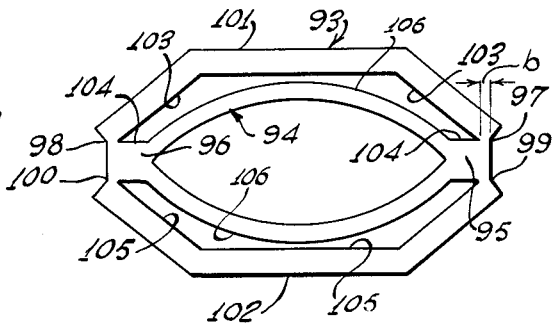
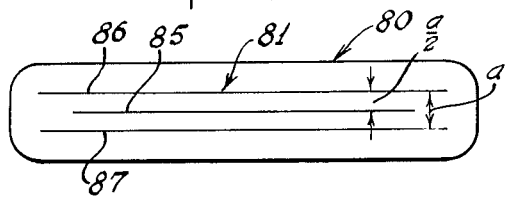
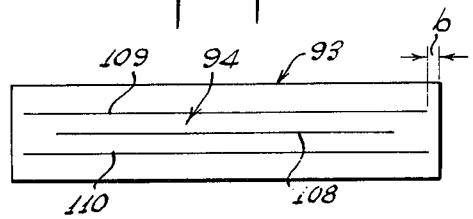
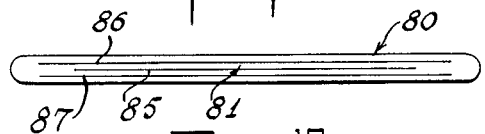
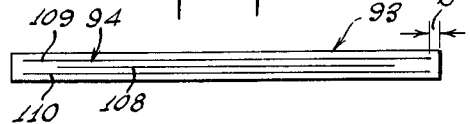
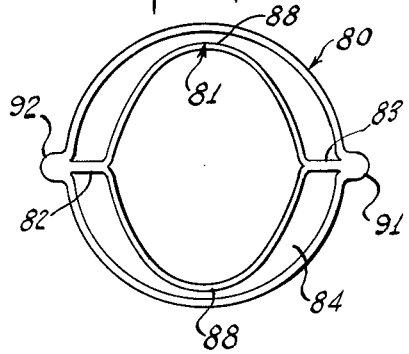
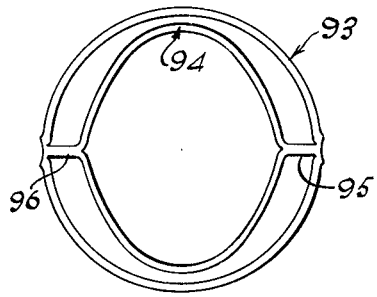

Aug. 24, 1965   H. A. FROMSON ETAL   3,201,861
METHOD OF MAKING A DOUBLE-WALLED TUBE
Filed March 31, 1960   5 Sheets-Sheet 3
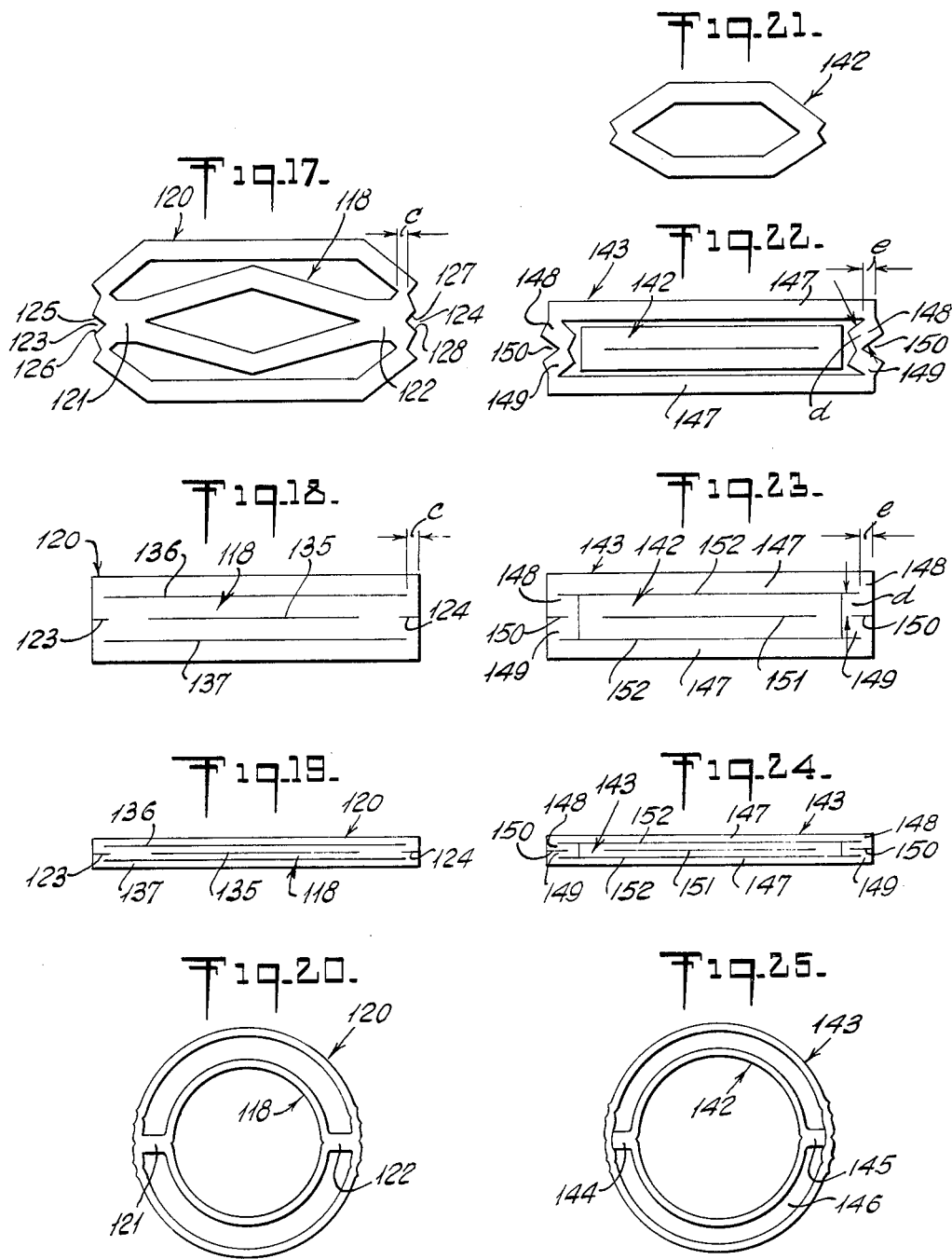
INVENTORS
HOWARD A. FROMSON
WILLIAM B. RYAN
BY
Burgess, Ryan, & Hicks
ATTORNEYS

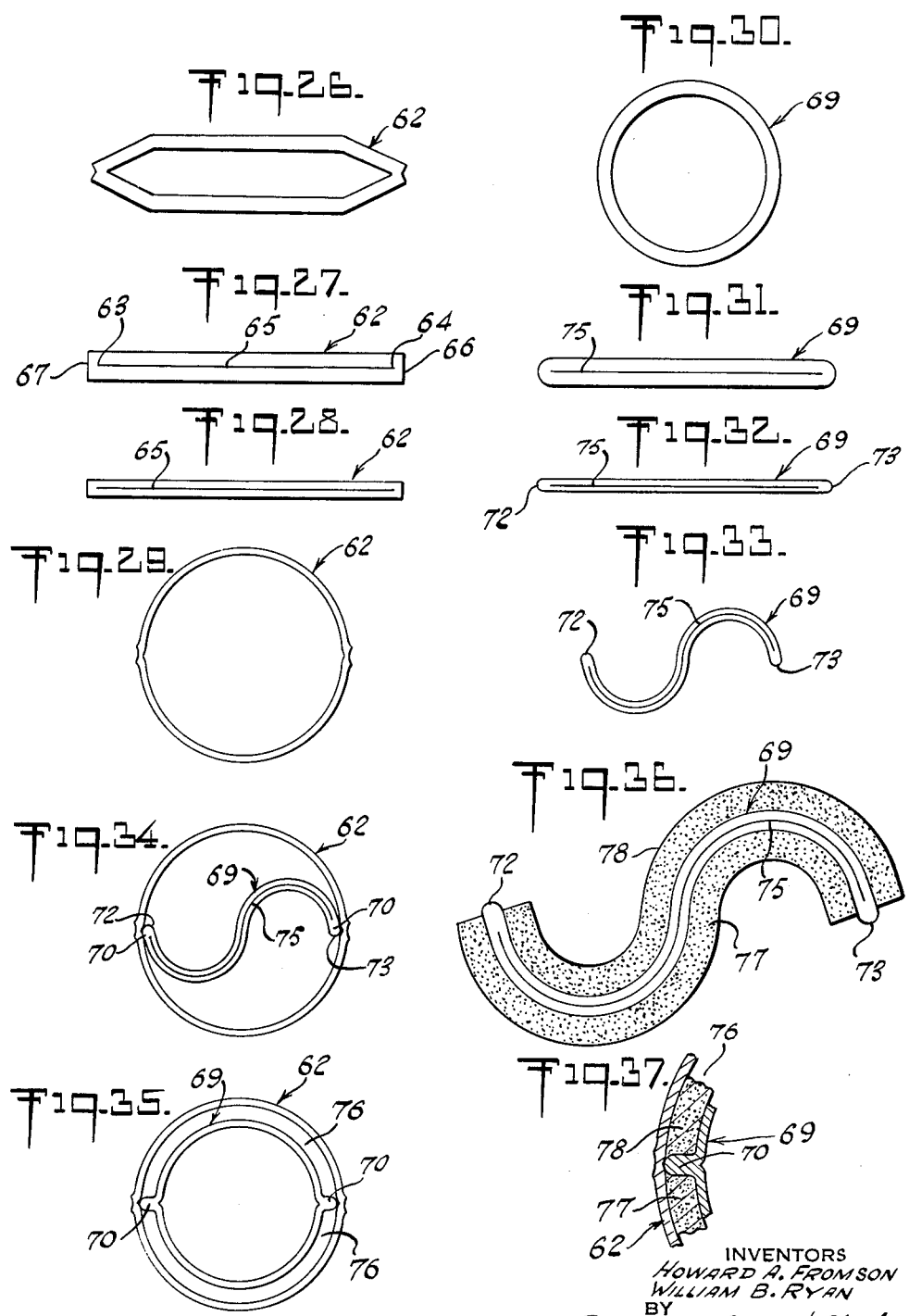

Aug. 24, 1965

H. A. FROMSON ETAL 3,201,861

METHOD OF MAKING A DOUBLE-WALLED TUBE

Filed March 31, 1960

INVENTORS
HOWARD A. FROMSON
WILLIAM B. RYAN
BY
Burgess, Ryan, & Hicks
ATTORNEYS

United States Patent Office 3,201,861
Patented Aug. 24, 1965

3,201,861
METHOD OF MAKING A DOUBLE-WALLED TUBE
Howard A. Fromson, Weston, Conn., and William B. Ryan, Pelham, N.Y., assignors, by mesne assignments, to Howard A. Fromson, Easton, Conn.
Filed Mar. 31, 1960, Ser. No. 19,041
1 Claim. (Cl. 29—455)

The present invention relates to double-walled tubes and method of forming the same. It relates, more particularly, to double-walled tubes comprising inner and outer tubular components which are assembled in transversely spaced relationship to define an annular space therebetween, and to the method of producing the same.

The double-walled tubes of the general type described have many diverse uses. For example, the tube may have its annular space between the inner and outer tubular components serve as a passage for heat transfer fluid therealong, and thereby may operate as a heat exchanger tube, or may have its space vacuated or filled with dead air or other insulating medium to serve as a flue or an insulated tube, or may serve any other purpose where a jacketed tube is required.

One object of the present invention is to provide a new and improved method of producing a double-walled tube of the type described.

A more specific object of the invention is to produce a double-walled tube by a new and improved method, (1) which permits the formation of a tube having walls which are thinner than those conveniently and efficiently possible with ordinary extrusion or rolling techniques but which are nevertheless strong, (2) which permits the tube to be compactly and safely transported, stored and/or handled in intermediate stage of preparation, and/or (3) which permits the tube in intermediate stage of preparation to be quickly, efficiently and inexpensively set up into final full form.

Another object of the invention is to provide a new and improved double-walled tube having one or more of the improved characteristics described above in connection with its preparation.

In accordance with certain features of the present invention, a double-walled tube blank desirably of metal is formed with inner and outer tubular components. In accordance with one specific form of the invention, these components are separately made and assembled to produce a composite blank and in accordance with another form of the invention, these two components are produced as an integral unit. In either case, the inner tubular component in partially prepared state is in the form of a thin collapsed rolled ribbon with its opposite halves disposed into contiguous unbonded relationship and separated by a closed opening or fissure and the thickness of the walls of this inner component at the sides are such in relation to the thickness of the other parts of the component, that when the component is fully inflated, as for example, by application of internal fluid pressure through said opening, the resulting component will have fins or ribs along each side extending from its outside towards the inner periphery of the outer tubular component. The dimensions of the inner tubular component in the collapsed ribbon-like condition described are such in relation to the internal dimensions of the outer tubular component, that when the inner and outer tubular components are fully inflated, the fins on the inner tubular component reach the inner periphery of the outer tubular component, thereby locating the inner tubular component in fixed transverse relationship with respect to the outer tubular component, and forming an annular space between the walls of the two components. The fins or ribs serve not only as spacers between the tubular components of the final double-walled tube but serve also as reinforcing members for the thin components.

In accordance with one line of species of the present invention, the blank comprising inner and outer tubular components is flattened and elongated longitudinally as a unit to produce a flat ribbon having the opposite flat walls of the inner component disposed into contiguous unbonded relationship and separated by a closed interior opening and having the opposite flat walls of the outer tubular component disposed into contiguous unbonded relationship with the contiguous walls of the inner component and separated from the latter walls by a pair of closed openings respectively flanking said interior opening. The longitudinal elongation of the blank unit after it has been collapsed into the form of a billet reduces the thickness of the walls of the tubular components without affecting substantially the sidewise dimensions of the blank, so that the different dimensional relationships of the components can be predetermined and maintained in the final form, thereby permitting accurate control of the final shape and size of the double-walled tube by proper selection of these dimensions. The flat ribbon produced as described is compact and can be inexpensively and conveniently shipped and/or stored in flat or coiled form without injury to the ribbon.

The flat ribbon can be inflated into final form by expanding the closed openings therein. The inner tubular component is shaped and designed as described in connection with the more generic aspects of the invention, so that when fully inflated, it has the shape of a tube with a pair of opposite longitudinal ribs or fins therealong on the outer sides thereof reaching the inflated outer tubular component also in the form of a tube to space the inflated inner component radially or transversely from the outer component.

In accordance with another line of species of the present invention, in order to erect the final doube-walled tube, the inner tubular component in collapsed transversely crooked ribbon condition is inserted into the outer component in tubular form, and the inner component is inflated to form the double-walled tube in which the two components may be radially or transversely spaced or arranged in peripheral contact as desired.

Various other objects, features and advantages of the present invention are apparent from the following description and from the accompanying drawings, in which FIG. 1 is an end view of an extruded outer tubular component which is employed to produce the double-walled tube of FIG. 8 in accordance with one specific embodiment of the process of the present invention;

FIG. 2 is an end view of a separate inner fully inflated tubular component which is employed to produce the doube-walled tube of FIG. 8 but shown prior to its collapse in preparation for assembly with the outer tubular component shown in FIG. 1;

FIG. 3 is an end view of the inner tubular component of FIG. 2 after it has been collapsed;

FIG. 4 is an end view of the two inner and outer tubular components of FIG. 1 and FIG. 3 after assembly;

FIG. 5 is an end view of the assembly of FIG. 4 after this assembly has been collapsed to produce a composite billet;

FIG. 6 is an end view of the collapsed composite billet of FIG. 5 after being rolled and longitudinally elongated to produce a flat ribbon;

FIG. 7 is an end view of the ribbon of FIG. 6 after full inflation of the closed opening between the opposed contiguous walls of the inner tubular component;

FIG. 8 is an end view of the final double-walled tube after the outer tubular component has been fully inflated;

FIG. 9 is an end view of an extruded one-piece tube blank comprising inner and outer tubular components integrally interconnected and adapted to be employed in the making of the one-piece double-walled tube of FIG. 12 in accordance with another embodiment of the process of the present invention;

FIG. 10 is an end view of the tube blank of FIG. 9 after collapse into the form of a billet;

FIG. 11 is an end view of the billet of FIG. 10 after rolling and longitudinally elongating into the form of a ribbon;

FIG. 12 is an end view of the one-piece double-walled tube produced by inflating the tubular components of the flat ribbon of FIG. 11;

FIG. 13 is an end view of an extruded one-piece tube blank comprising inner and outer tubular components integrally interconnected and adapted to be employed in the making of the double-walled tube of FIG. 16 in accordance with still another embodiment of the process of the present invention;

FIG. 14 is an end view of the tube blank of FIG. 13 after collapse into the form of a billet;

FIG. 15 is an end view of the billet of FIG. 14 after rolling and longitudinally elongating into the form of a flat ribbon;

FIG. 16 is an end view of the double-walled tube produced by inflating the tubular components of the flat ribbon of FIG. 15;

FIG. 17 is an end view of an extruded one-piece tube blank comprising inner and outer tubular components integrally interconnected and adapted to be employed in the making of the double-walled tube of FIG. 20 in accordance with another embodiment of the process of the present invention;

FIG. 18 is an end view of the tube blank of FIG. 17 but after collapse into the form of a billet;

FIG. 19 is an end view of the billet of FIG. 18 after rolling and longitudinally elongating into the form of a flat ribbon;

FIG. 20 is an end view of the double-walled tube produced by inflating the tubular components of the flat ribbon of FIG. 19;

FIG. 21 is an end view of an extruded inner tubular component employed to produce the double-walled tube of FIG. 25 in accordance with another embodiment of the process of the present invention and shown prior to its collapse in preparation for assembly with the outer tubular component shown in FIG. 22;

FIG. 22 is an end view of the inner tubular component of FIG. 21 in assembly with an outer tubular component for producing the double-walled tube of FIG. 25;

FIG. 23 is an end view of the assembly of FIG. 22 after collapse into the form of a billet;

FIG. 24 is an end view of the collapsed assembly of FIG. 23 after rolling and longitudinally elongating into the form of a flat ribbon;

FIG. 25 is an end view of the ribbon of FIG. 24 after its inflation into a double-walled tube;

FIG. 26 is an end view of an extruded outer tubular component which is employed as a blank to produce the double-walled tube of FIG. 35 in accordance with another embodiment of the process of the present invention;

FIG. 27 is an end view of the outer tubular component of FIG. 26 after collapse;

FIG. 28 is an end view of the outer tubular component of FIG. 27 after it has been rolled and longitudinally elongated to produce a flat ribbon;

FIG. 29 is an end view of the outer tubular component of FIG. 28 after being fully inflated in preparation for assembly with the inner tubular component;

FIG. 30 is an end view of an inner tubular component which is employed as a blank to produce the double-walled tube of FIG. 35;

FIG. 31 is an end view of the inner tubular component of FIG. 30 after collapse;

FIG. 32 is an end view of the inner tubular component of FIG. 31 after it has been rolled and longitudinally elongated into the form of a flat ribbon;

FIG. 33 is an end view of the ribbon of FIG. 32 after it has been bent in S-shape for insertion into the inflated outer tubular component shown in FIG. 29;

FIG. 34 is an end view of the inflated outer tubular component of FIG. 29 with the S-shaped ribbon of FIG. 33 inserted therein for assembly prior to the setting up of the double-walled tube of FIG. 35;

FIG. 35 is an end view of the double-walled tube of FIG. 34 after the S-shaped inner ribbon component has been fully opened up to produce the final product;

FIG. 36 is an end view of an S-shaped ribbon similar to that shown in FIG. 33 but on a larger scale to form an inner tubular component and shows this ribbon clad on both faces with opposed layers of insulation;

FIG. 37 is a partial transverse section of the double-walled tube formed by employing the insulated S-shaped ribbon of FIG. 36 in the outer tubular component of FIG. 29 and expanding said insulated ribbon;

Figure 38:
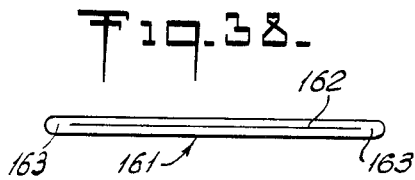
FIG. 38 is an end view of an inner tubular component in flat ribbon reduced form to be employed in producing a lined tube shown in FIG. 41 in accordance with another embodiment of the process of the present invention.

Referring to FIG. 8, there is shown a metal double-walled tube to be produced by the process of the present invention. This tube comprises a thin cylindrical outer tubular component 40 encircling a thin inner tubular component 41 and separated therefrom by an annular space 42. The inner tubular component 41 is cylindrical except for a pair of similar fins or ribs 52 and 53 formed on diametrically opposite sides of the component integrally therewith and extending therealong. These fins 52 and 53 extend radially from the outside of the inner tubular component 41 and reach the inner periphery of the outer tubular component 40 to serve (1) as spacers by which the inner tubular component 41 is centrally held inside the outer tubular component, (2) as reinforcing ribs for the inner tubular component, and (3) as props for the opposite sections of the outer tubular component 40 to resist inward collapse of the latter sections.

The double-walled tube shown in FIG. 8 is made by the steps of the process illustrated in FIGS. 1–8. Referring to FIG. 1, there is shown the outer tubular component 40 in the initial seamless blank form before being processed in the manner to be described. This outer tubular component is desirably produced in cross-sectionally elongated form by extrusion to provide comparatively wide opposed face walls 44 of uniform thickness connected together by shorter side walls 48 of lesser thickness. The opposed walls 44 bulge slightly and angularly outwardly, and the side walls 48 bulge curvedly inwardly, so that when the outer tubular component 40 is compressed inwardly in opposite directions transverse to the wider walls 44, the component will be shaped into a form having a rectangular cross-sectional shape, as shown in FIG. 5.

FIG. 2 shows the inner tubular component 41 in its initial seamless blank form before being processed in the manner to be described. This inner component is shown in the form of a cylindrical tube of uniform thickness, and may be made in any suitable manner, but is desirably made by extrusion. This inner tubular component 41 is collapsed by a roller or press into the condition shown in FIG. 3, to flatten and bring the two opposed walls 55 of the component together into contiguous relationship separated by a central closed fissure or opening 43. These opposed parts 55 of the inner component 41 are left unbonded to prevent them from adhering during subsequent rolling operation. For that purpose, suitable expedients may be employed, and in the case, for example, where the inner tubular component 41 is of aluminum or aluminum alloy, a layer of heavy oil or other lubricant such as graphite may be applied to the inner surfaces of the walls 55 before the component is flattened into the condition shown in FIG. 3.

The tube components 40 and 41 in the form shown in FIGS. 1 and 3 are then assembled with the component 41 inside the component 40, (FIG. 4), and the resulting assembly is pressed or rolled to shape the outer component 40 rectangularly and snugly against the inner component 41, until the assembled unit assumes the billet form of rectangular cross-sectional shape shown in FIG. 5. In this collapsed form, the opposed flattened walls of the outer tubular component 40 contiguous with the flattened walls 55 of the inner tubular component 41 will be separated therefrom by closed fissures or openings 51 flanking the central opening 43. These flanking openings 51 may be filled by a suitable material, as for example, a heavy lubricating oil or graphite to prevent bonding in these openings during subsequent rolling. This filling may be created by applying a coating of lubricant to the outer surfaces of the walls 55 of the collapsed inner tubular component 41 or to the inner surfaces of the walls 44 of the outer tubular component 40 or to both, before assembly.

To assure the final formation of the two tubular components 40 and 41 concentrically into cylindrical shape, the outer component 40 is dimensioned in relation to the inner component 41 to define spaces 45 between the side edges of the flattened inner component 41 and the straightened side walls 48. These spaces 45 may be filled with tightly packed pressure-sustaining material, as for example, a lead alloy graphite, either in extruded form or in tightly packed powder form, or aluminum oxide or magnesium oxide in similar form.

The collapsed assembled billet of FIG. 5 packed as described with pressure sustaining material, is then rolled in a lengthwise direction parallel to the longitudinal axis of the tubular components to reduce it into the shape of a flat ribbon shown in FIG. 6. This rolling and reducing operation is continued until the entire thickness of the inner tubular component 41 has been reduced to twice the desired wall thickness of the final thin-walled fully inflated inner tubular component and the thickness of each of the walls 44 of the outer tubular component 40 has been reduced to the thickness of the final thin-walled fully inflated outer tubular component. Such rolling will not cause appreciable increase in the width of the collapsed assembly shown in FIG. 5 or in the transverse or sidewise dimensions of the fissures or openings 43 and 51. Thus, when the ribbon shown in FIG. 6 is erected and fully inflated, the internal diameter of the inner tubular component 41 will be approximately the same as the internal diameter of its cylindrical blank shown in FIG. 2, and the circumference of the inner periphery of the fully inflated outer tubular component 40 will be equal substantially to the length of the inner periphery of the outer tubular blank shown in FIG. 1, except for deviation due to the reduction in the length of the side walls 48 of said outer blank resulting from the rolling and reducing operations described. It is seen, therefore, that the shape and dimensions of the final double-walled tube of FIG. 8 will be governed by the shapes and dimensions of the inner and outer tubular blanks in their initial forms.

The composite unit in the compact ribbon form shown in FIG. 6 can be stored and shipped conveniently with minimum of injury. For setting up the double-walled tube, fluid under pressure is first introduced into the central opening 43 to inflate the inner tubular component 41. This may be accomplished, for example, by removing the pressure-sustaining material from the spaces 45 of the ribbon, although this is not necessary, prying open one end of the opening 43, inserting a nozzle or pipe therein and clamping the partially expanded ribbon about the nozzle. Water under pressure introduced into said nozzle may be used to inflate the inner tubular component 41. The inner tubular component 41 by this operation will be inflated into the cylindrical shape shown in FIG. 7, and the outer tubular component 40 closely hugging the inner tubular component will also be inflated as shown in FIG. 7. However, since the circumferential length of the outer tubular component 40 is greater than that of the inner tubular component 41, spaces will be formed on the sides of the partially inflated tube between the inner and outer tubular components, as shown in FIG. 7. Fluid such as water under pressure introduced into these side spaces will cause the outer tubular component 40 to inflate radially into cylindrical shape away from the inner tubular component 41, and the resulting product will be the double-walled tube shown in FIG. 8. If desired, the inner tubular component 41 may be maintained under fluid pressure during inflation of the outer tubular component 40, to prevent collapse of the inner tubular component 41.

As will be seen from FIG. 8, the fully inflated outer tubular component 40 in the final double-walled tube will have low ridges 54 on its outer surface, but these can be removed if desired, as for example, by grinding, although this may not be necessary.

The inner tubular component 41 when fully inflated will have fins or ribs 52 and 53 on diametrically opposite sides thereof reaching to and contacting the inner periphery of the fully inflated outer tubular component 40 to serve the different functions described. It should be noted that since the transverse or sidewise dimensions of the assembly billet shown in FIG. 5 are not altered by the rolling and reducing operation resulting in the ribbon of FIG. 6, the thickness of the inner tubular component 41 at the sides between the ends of the central opening 43 and the sides of the inner component in the ribbon remains substantially the same as the thickness of the tubular blank shown in FIG. 2, while the other parts of the component walls are reduced in thickness. This will assure the formation of the fins 52 and 53.

The various dimensions of the blanks are chosen according to the desired shape and dimensions of the final double-walled tube. If the double-walled tube is required to have the two fully inflated components 40 and 41 cylindrical in shape, then the distance from point 49 to point 50 measured along the inner surface 59 of the outer tubular component 40 in FIG. 8, must be greater than the distance between these points measured along the outer surface 56 of the inner tubular component 41 including the fins 52 and 53. Since very little side spread takes place during rolling, as already described, the distance measured along the outer surface 56 and the fins 52 and 53 of the fully inflated inner tubular component 41 in FIG. 8 is substantially the same as the surface distance between the extreme sides 57 and 58 of the collapsed inner tubular component of FIG. 3, except for deviation due to the reduction in transverse thickness resulting from the rolling to the thin ribbon shape of FIG. 6, and this distance is in turn substantially equal to half the outer circumference of the inner tubular component 41 in the blank shown in FIG. 2.

Also, the circumferential distance between points 49 and 50 measured around the inner surface 59 of the inflated outer tubular component 40 of FIG. 8 is approximately equal to the distance between points 49 and 50 on the same surface in the reduced rolled ribbon of FIG. 6, and this distance is almost equal to the distance between points 49 and 50 along the inner surface of the outer tubular component 40 in the blank form shown in FIG. 1, except for deviation due to the reduction in the length of the walls 48 by rolling. Thus by selecting the proper dimensions of the inner and outer tubular component blanks shown in FIGS. 1 and 2, it is possible to insure that both the inner and outer tubular components 40 and 41 in the double-walled tube of FIG. 8 will be cylindrical and of the proper size. By making the wall thickness at points 49 and 50 on the outer tubular component 40 in the blank form shown in FIG. 1, i.e. the thickness of the walls 48, approximately equal to the desired wall thickness of the final outer tubular component in the final inflated condition shown in FIG. 8, fins on the outer tubular component may be avoided and only the low ridges 54 will be evident.

In the method illustrated in FIGS. 1–8, the tubular components of the metal double-walled tube are seperately made and are then assembled for further processing. FIGS. 9 to 12 illustrate an embodiment of the method of the present invention, in which the metal tubular components are formed as an integral unit and are processed to produce a one-piece double-walled tube shown in FIG. 12. This one-piece double-walled tube comprises an outer tubular component 80 and an inner tubular component 81 separated by an annular space 84 and integrally interconnected by a pair of fins 82 and 83 extending from diametrically opposite sides of the inner tubular component radially to the outer tubular component. This one-piece double-walled tube is produced from a one-piece tube blank shown in FIG. 9 and comprising an outer thick-walled tubular component 80 and an inner thick-walled tubular component 81 of cylindrical shape, concentrically arranged and integrally interconnected by fins 82 and 83. The seamless tube blank of FIG. 9 is desirably made by extrusion, and for the purpose to be made apparent, the width of each of the fins 82 and 83 in a circumferential direction, indicated by the symbol $a$, is equal to approximately twice the thickness of the wall of the inner tubular component 81 in a radial direction indicated by the symbol $a/2$.

The tube blank formed as shown in FIG. 9, is coated on the inner surface of the inner tubular component 81 and on either or both confronting surfaces of the inner and outer tubular components 80 and 81 with heavy oil or other suitable lubricant to prevent bonding in the different closed openings or fissures formed by subsequent collapsing, rolling and reducing, to be described.

The tube blank of FIG. 9 prepared as described, is then collapsed by rolling or pressing to form the billet of substantially rectangular cross-section shown in FIG. 10. This billet will have a central closed opening or fissure 85 defined between the collapsed opposite wall sections of the inner tubular component 81, and outer closed openings or fissures 86 and 87 parallel to and flanking the central opening and defined between the wall sections of the collapsed outer and inner tubular components 80 and 81 on opposite sides of the blank. The two outer openings 86 and 87 are of equal length and the central opening 85 of shorter length is centered longitudinally and transversely between said outer openings. The distance between the outer openings 86 and 87 will correspond approximately to the circumferential width $a$ of the fins 82 and 83 in FIG. 9 and the distance between the central opening 85 and either of the outer openings 86 and 87 will correspond approximately to the radial thickness $a/2$ of the inner tubular component 81 of FIG. 9.

The billet of FIG. 10 is then rolled longitudinally thereof to reduce it to the thin ribbon form shown in FIG. 11 without substantially altering the sidewise dimensions of the billet. This ribbon is then fully inflated desirably by fluid pressure applied in the openings 85, 86 and 87 in the manner previously described in connection with FIGS. 1–8, to produce the one-piece doublewalled tube shown in FIG. 12.

Due to the geometry of the shapes involved, if the fully inflated outer tubular component 80 of the doublewalled tube of FIG. 12 is circular in cross-section, then the inner tubular component 81 will necessarily be approximately elliptical with its major axis through the highest points 88 of the inner tubular component extending at right angles to the minor axis passing through the two opposite points of connection of the fins 82 and 83.

Also, since the radial wall thickness of the outer tubular component 80 in the blank of FIG. 9 is much greater than the radial wall thickness of this component in the final double-walled tube of FIG. 12, and since the transverse distance from the ends of the outer openings or fissures 86 and 87 to the sides of the billet of FIG. 10 corresponding substantially to this wall thickness remains substantially constant, even when reduced to the ribbon form of FIG. 11, the excess material afforded at the sides of the ribbon by this condition creates the fins 91 and 92 on the outer sides of the outer tubular component in alignment with the fins 82 and 83 between the walls of the inner and outer tubular components 80 and 81. In view of the continuity and integrality between the fins 83 and 91, between the fins 82 and 92 and the integral connection of the walls of these components to these fins, the outer fins 91 and 92 add materially to the structural strength and rigidity of the double-walled tube.

In spite of the structural advantages afforded by the reinforcing fins 91 and 92 on the outside of the doublewalled tube, it may be desirable to produce a doublewalled tube made of one piece and free from such protuberances. For that purpose, the process illustrated in FIGS. 13 and 16 may be employed. By that process, the one-piece double-walled tube of FIG. 16 is produced, comprising an inner tubular component 94 and an outer tubular component 93 integrally interconnected at the sides in spaced relationship by fins 95 and 96. The outer surface of the outer tubular component 93, except perhaps for some slight cusps, is free from any pronounced saliency corresponding to the fins 91 and 92 of FIG. 12.

For producing the one-piece double-walled tube of FIG. 16, a one-piece seamless tube blank is employed as shown in FIG. 13, formed preferably by extrusion. This tube blank comprises an outer tubular component 93 having a cross-section elongated sidewise and formed with two opposed channel-shaped sheets 101 and 102 in reverse relationship consisting of straight parallel face wall sections merging into straight converging side wall sections joined at the sides through fins 95 and 96. The thickness of the walls of the outer tubular component 93 in the blank is uniform except at the sides, the shape and dimensions of which will be described hereinafter.

The inner tubular component 94 is also elongated sidewise, but is formed of opposite curvedly arched wall sections of uniform thickness in reversed relationship converging to inner apices and joined at the sides through the fins 95 and 96. The two tubular components 93 and 94 are interconnected at the sides of the blank by the fins 95 and 96.

The converging face wall sections of the outer tubular component merge into the fins 95 and 96 and have their outer ends 97, 98, 99 and 100 extending angularly with respect to the outer ends of the fins to form therewith shallow grooves along the side of the blank. The junctures between these converging face wall sections of the outer tubular component 93 and the fins 95 and 96 are so designed and dimensioned, and the inner and outer tubular components 94 and 93 are so designed and dimensioned, that the distances $b$ at these junctures are equal approximately to the desired wall thickness of the outer tubular component 93 in the final double-walled tube shown in FIG. 16; the distance along the inner surfaces 103 and 105 of each of the two opposed channel-shaped sheets 101 and 102 respectively of the outer tubular component 93 is approximately equal to the distance along the outer surface 106 of each of the curvedly arched wall sections of the inner tubular component 94 plus the two distances 104 along the corresponding free edges of the fins 95 and 96; and the thickness of each of the fins 95 and 96 between its face edges is equal approximately to twice the thickness of each of the wall sections of the inner tubular component 94.

After the internal surfaces of the blank of FIG. 13 have been coated with heavy oil or other lubricant or substance, if such is required to prevent bonding of contiguous surfaces during subsequent rolling and reducing, the blank is collapsed by rolling or pressing into the form of a billet of rectangular cross-section shown in FIG. 14. The confluency of the side wall sections of the blank towards opposed apices insures the collapse of the blank towards a predetermined plane passing through these apices. The angular outer edges 97, 98, 99 and 100 of the blank straighten out by this collapse to form with the ends of the fins 95 and 96 the flat sides of the billet. Opposed wall sections of the tubular components coming into contiguous relationship by this collapsing operation form therebetween a central closed opening or fissure 108, and a pair of similar outer parallel closed openings or fissures 109 and 110 of equal length and longer than the central opening flanking the central opening. The distance between the ends of these outer openings 109 and 110 and the corresponding sides of the billet is equal approximately to the thickness $b$ of the wall of the outer tubular component 93 of the desired final double-walled tube of FIG. 16 to be produced, and the distance between each end of the central opening 108 and the corresponding side of the billet is equal approximately to the length of the fin 95 or 96 plus the thickness of the wall of the outer tubular component of the tube of FIG. 16 where said fin joins into the latter component.

The billet of FIG. 14 is then rolled along its length to reduce it to the thin ribbon form shown in FIG. 15 without substantially altering the sidewise dimensions. When it is desired to set up the final double-walled tube of FIG. 16, the ribbon of FIG. 15 is fully inflated through its openings 108, 109 and 110 by fluid pressure. The double-walled tube produced will be similar to that shown in FIG. 12, except that the outer tubular component will be free of outer fins corresponding to the fins 91 and 92 of FIG. 24.

Another difference in the processes between that illustrated in FIGS. 9–12 and that illustrated in FIGS. 13–16 is that in the latter process, the blank is preformed into partially flattened state, so that transition from the blank form to the flattened billet form by rolling or pressing is accomplished more smoothly, accurately and efficiently, as already described.

In the processes of FIGS. 9 to 16, the final inner tubular component formed is not circular when the outer tubular component formed is circular. To make the inner tubular component 81 circular, it is necessary to enlongate the outer tubular component 80 along an axis passing through the fins 82 and 83. The double-walled tube may be so shaped if desired. These constructions may be satisfactory, but there may be cases where it is desired to produce a metal one-piece double-walled tube with both inner and outer tubular components circular. FIGS. 17–20 illustrate a process for producing such a tube. This tube shown in FIG. 20 comprises an inner circular tubular component 118 and an outer circular tubular component 120 concentric therewith and integrally joined thereto in radially spaced relationship through diametrically opposed radially extending fins 121 and 122.

To produce the one-piece double walled tube of FIG. 20, a one-piece blank is first formed desirably by extrusion, as shown in FIG. 17. The blank of FIG. 17 is somewhat similar to that shown in FIG. 13, except that the inner tubular component 118 instead of having opposed wall sections curvedly arched as in FIG. 13 it has opposed wall sections angularly arched to define conjointly a diamond shape tubular cross-section, but more importantly, the outer sides of the blank in the regions of the fins 121 and 122 are cleft by two slits 123 and 124 respectively, so that each fin is substantially in Y-form. The two divergent branches of the fin 121 have inner confronting surfaces 125 and 126 defining the slit 123, and the two divergent branches of the other fin 122 have inner confronting surfaces 127 and 128 defining the slit 124.

The cleaving of the sides of the blank of FIG. 17 has the effect of increasing the length of the wall of the outer tubular component 120 in relation to the length of the wall of the inner tubular component 118, as compared to the length of the wall of the outer tubular component in relation to the length of the wall of the inner tubular component in the embodiments of the invention illustrated in FIGS. 9–16, and this increase can be controlled by appropriate design and dimensioning to cause both the inner and outer tubular components 118 and 120 to be circular and concentric when fully inflated, as shown in FIG. 20.

The blank of FIG. 17 is so designed and dimensioned that the width $c$ where each wall section of the outer tubular component 120 merges into the corresponding branch of the fin 121 or 122 is equal substantially to the desired thickness of the wall of the outer tubular component in the final form of the double-walled tube of FIG. 20.

The internal surfaces of the blank of FIG. 17, which come together into contiguous relationship upon collapse of the blank are coated with heavy oil or other lubricant or non-bonding substance and the blank is collapsed by rolling or pressing to close the slits 123 and 124 and to produce the billet of FIG. 18 having a substantially rectangular cross-section. The billet produced by this operation will have a center opening or fissure 135 located centrally between and in alignment with the closed side slits 123 and 124 and flanked by outer closed openings or fissures 136 and 137 or greater length centered with respect to said center opening.

The billet of FIG. 18 is then rolled longitudinally of the billet and reduced without altering substantially the sidewise dimensions of the billet to produce the thin ribbon of FIG. 19. This ribbon when fully inflated through the application of fluid pressure in the openings 135, 136 and 137 will produce the one-piece double-walled tube of FIG. 20 with both inner and outer tubular components 118 and 120 circular and concentric. The branches of the cleft fins 121 and 122 of the blank by the process of FIGS. 17–20 described are converted into additions to the circumferential length of the wall of the outer tubular component 120, thereby permitting the distances between the inner sides of the fins in the final double-walled tube of FIG. 20 to be increased sufficiently compared with the corresponding distances in the tubes of FIGS. 12 and 16 to circularize the walls of the inner tubular component 118.

In the construction of FIGS. 17–20, the slits 123 and 124 may be made deep enough to permit the outer tubular component 120 when fully inflated to be made approximately elliptical in cross-section with the minor axis of the ellipse coincident with the plane of the fins, or may be such, as to permit the outer tubular component when fully inflated to be made substantially circular in cross-section and the inner tubular component 118 to be approximately elliptic with its major axis coincident with the plane of the fins.

In the process of FIGS. 1–8, in order to make both the inner tubular component 41 and the outer tubular component 40 circular in cross-section in the final double-walled tube, it was necessary to make the internal width of the blank of the outer component sufficiently greater than the external width of the blank of the internal tubular component, to create spaces 45 between the sides of the flattened inner component and the side walls of the outer component, as shown in FIG. 5. This necessitated the filling of these spaces with pressure-sustaining material. The technique of employing side slits illustrated in connection with the process of making a one-piece double-walled tube illustrated in FIGS. 17–20 may be employed in connection with the process of making a two-piece double-walled tube with circular components illustrated in FIGS. 1–8, without forming any spaces in the billet requiring pressure-sustaining material. The modified process illustrated in FIGS. 21–25 for that purpose produces a double-walled tube shown in FIG. 25, having an inner tubular component 142 and a separate outer tubular component 143 of circular cross-section, concentrically spaced from the inner tubular component by a pair of fins 144 and 145 on diametrically opposite sides of the inner tubular component to produce an annular space 146 between the components.

The inner tubular component 142 for the double-walled tube is produced from a blank shown in FIG. 21 desirably made by extrusion, and having walls of uniform thickness all over including at the sides. This inner tubular component comprises opposite channel-shaped face wall sections in reverse relationship, integrally connected together, and shaped so that when the blank is collapsed by rolling or pressing, it assumes the substantially rectangular cross-section shown in FIG. 22. Before the blank 142 is so compressed, its internal surface is coated with a heavy oil or other substance to prevent bonding of the contiguous wall surfaces upon subsequent rolling and reducing.

The blank for the outer tubular component 143 shown in FIG. 22 comprises opposite parallel face walls 147 of uniform thickness, connected at the sides by side walls resembling the folds of a bellows, each of said side walls comprising two sections 148 and 149 arranged in the form of a V with an intervening V-slit 150 and extending at acute angles with said parallel walls. The thickness $d$ of these side wall sections 148 and 149 is substantially equal to the thickness of the parallel face walls 147 and also of the wall of the inner component on either side of the opening 151.

The blank for the outer tubular component 143 shown in FIG. 22 is so shaped that when it is compressed, the side walls 148, 149 collapse and close and the blank assumes a rectangular cross-section, as shown in FIG. 23. The thickness $e$ at the juncture between the face walls 147 and the side walls 148, 149 in the blank of the outer tubular component 143 is equal substantially to the desired thickness of the outer tubular component in the final double-walled tube of FIG. 25.

The collapsed inner blank 142 shown in FIG. 22 is externally coated with a heavy oil or other agent to prevent bonding of contiguous surfaces and is inserted inside the blank for the outer tubular component 143, as shown in FIG. 22, the internal surface of the blank of the outer tubular component 143 may also be coated with the non-bonding agent and the blank of said component in the assembly shown in FIG. 22 is collapsed about the collapsed inner tubular component 142 to form the composite billet of substantially rectangular cross-section shown in FIG. 23. The dimensions of the different blanks may be so selected that the outer tubular component 143 snugly embraces the inner tubular component 142 on all sides when the assembly is collapsed into billet form shown in FIG. 23, so that there are no voids or spaces between the components to be filled with pressure-sustaining materials.

The billet shown in FIG. 23 will have a closed center opening or fissure 151 defined between the opposite contiguous wall sections of the inner tubular component 142, a pair of longer outer flanking closed openings or fissures 152 of equal length between the contiguous wall sections of the inner and outer tubular components, and closed slits 150. The billet so formed is then rolled along its length to reduce it to thin ribbon form shown in FIG. 24 without altering substantially the sidewise dimensions of the billet.

When it is desired to erect or set up the final double-walled tube, the ribbon of FIG. 24 is inflated through the openings 151 and 152 into the fully inflated circular form shown in FIG. 25.

Since the sidewise dimensions of the billet have not been changed by the rolling, the distance from each end of the center opening 151 to the adjoining side 153 of the inner tubular component in the billet of FIG. 23 remains the same in the ribbon of FIG. 24 but is greater than the reduced thickness of the walls of said component in said ribbon. Therefore, when the inner tubular component 142 is fully inflated, the excess material on the sides of the inner tubular component 142 in the ribbon beyond that required for the side walls of the latter component manifests itself in the form of fins 144 and 145, as already described in connection with FIGS. 1–8. The slits 150 in the sides of the outer tubular component 143 in the blank of FIG. 22 carried through to the ribbon of FIG. 25, afford added circumference to the wall of the inflated outer tubular component 143 corresponding approximately to four times the length of a slit 150, and this added circumference permits the formation of a compact voidless billet and at the same time, the inflation of the inner and outer tubular components 142 and 143 into substantially cylindrical form, except for the radiating fins 144 and 145.

By means of the methods of the present invention, a comparatively thick-walled, short extruded tube blank or blanks may be transformed by rolling into a thin-walled, long, double-walled tube. The walls of the final tube may be made much thinner than is possible with ordinary extrusion procedures.

The thin compact ribbons made preliminary to the erection of the final double-walled tubes therefrom may be stored and shipped either in straight or coiled form conveniently, inexpensively and without damage. The double-walled tube inflated therefrom may be employed as heat-exchanger units in which heat-exchange fluids are passed through the inner tubular component or through the annular space between the tubular components, or may be employed as flues in which the annular space between the tubular components prevents over-heating of the outer tubular component.

FIGS. 26–35 illustrate another embodiment of the process of the present invention for producing the metal double-walled tube of FIG. 35 similar to that shown in FIG. 8, but in which the outer tubular component is made independently of the inner tubular component, and may even be part of an existing structure. This tube comprises a thin cylindrical outer tubular component 62 encircling a thin inner tubular component 69 and separated therefrom by an annular space 76. The inner tubular component 69 is cylindrical except for a pair of similar fins or ribs 70 formed on diametrically opposite sides of the component integrally therewith and extending therealong. These fins 70 extend radially into contact with the outer tubular component 62 and serve the same functions as they do in the construction of FIG. 8. As far as certain aspects of the invention are concerned, the outer tubular component 62 may be preformed in any suitable manner, but to assure the formation of a very thin component where such is required, it may be made by an extrusion, rolling and inflating operation. To that end, the outer tubular component blank 62 shown in FIG. 26 is extruded in partially flattened cross-sectionally elongated form with a pair of opposite face walls of uniform thickness converging and joined at the sides, so that the blank when compressed across its face walls will collapse towards a predetermined plane passing through the internal apices at the sides of the blank. The blank so formed, when pressed or rolled transversely of its opposite face walls and completely collapsed will assume the flat rectangular form shown in FIG. 27. This blank 62 before being collapsed is internally coated with a materials such as a heavy oil or other lubricant to prevent the opposed walls of the collapsed component to become bonded together, when the blank is rolled and reduced into ribbon form to be described, and to form an expansible closed opening or fissure 65 between these walls.

The dimension of the sides of the blank 62 in the form shown in FIG. 26 is such, that when the blank is completely collapsed into the form shown in FIG. 27, the thickness of the walls in the latter form between one end 63 of the opening 65 and the adjacent side 67 of the collapsed blank and between the other end 64 of the opening and the other side 66 of the collapsed blank is approximately equal to the thickness of the wall of the final fully inflated outer tubular component 62 shown in FIG. 35. The blank 62 completely collapsed into flat rectangular form shown in FIG. 27 is then rolled lengthwise of the blank into the thin ribbon form shown in FIG. 28 to reduce the thickness of the blank without reducing its width or other sidewise dimensions. The ribbon of FIG. 28 is then fully inflated, as for example, by water or other fluid under pressure into the circular form shown in FIG. 29.

For producing the inner tubular component 69, a cylindrical blank of substantially uniform thickness around its circumference is first formed, as shown in FIG. 30, preferably by extrusion. The cylindrical blank is internally coated with non-bonding material, such as heavy oil, is collapsed by rolling or pressing into the flat shape shown in FIG. 31 and is reduced by rolling in a lengthwise direction without substantially altering its sidewise dimensions, to form the thin flat ribbon 69 shown in FIG. 32, with an unbonded closed opening or fissure 75. The ribbon 69 of FIG. 32 in its flat state is too wide to fit into the outer tubular component 62 but is transversely bent into crooked shape shown in FIG. 33 to bring its sides 72 73 together to a distance equal to or less than the internal diameter of the outer tubular component 62 shown in FIG. 29 to permit said ribbon to fit into said outer tubular component. The ribbon 69 is bent in such shape as to permit it to be expanded smoothly with balance and equilibrium, so as to not to produce kinks therein, and for that purpose, is formed as shown in FIG. 33 into an S-shape cross-section with similar reversed loops, as for example, by progressive roll-forming or by other means which do not affect the dimensions of the ribbons.

The outer tubular component 62 may be stored and/or shipped in the flat ribbon form shown in FIG. 28 and the inner tubular component 69 may also be stored and/or shipped in the flat form shown in FIG. 32 or in the crooked ribbon form shown in FIG. 33.

When the double-walled tube is to be set up, the S-shaped inner tubular component 69 of FIG. 33 is inserted into the outer tubular component 62 of FIG. 29 to form the assembly shown in FIG. 34. The ribbon is so shaped and dimensioned that its ends 72 and 73 will be at diametrically opposite sides of the inner periphery of the inflated outer tubular component 62. The creases produced at the diametrically opposite sides of the fully inflated outer tubular component 69 by the folds at the ends of the opening 65 of the ribbon of FIG. 28 serve as anchoring points for the ends of the inner tubular component 69 in the outer tubular component, as shown in FIG. 34. The inner tubular component 69 so shaped and located is then inflated by fluid pressure into the cylindrical shape to form the double-walled tube of FIG. 35.

By considering the fact that rolling to reduce the thickness of the collapsed components 62 and 69 does not alter substantially the sidewise dimensions and by selecting the proper dimensions of the components in the blank forms shown in FIGS. 26 and 30, the formation of the tube shown in FIG. 35 with cylindrical concentric components 62 and 69 and with the radial spacer fins 70 extending to the outer tubular component 62 is assured, as described in connection with the form of the invention illustrated in FIGS. 1–8.

In the embodiment of the invention shown in FIGS. 26–35, the double-walled tube produced has its annular space 76 between the inner and outer tubular components 62 and 69 clear to hold dead air or other fluid or to serve as a passageway for a heat-exchange fluid. In the embodiment of the invention shown in FIGS. 36 and 37, the double-walled tube is produced with solid insulating material 77 and 78 filling the annular space 76. To that end, the S-shaped ribbon 69 of FIG. 33 is conformably covered on its opposite sides with two layers 77 and 78 of insulating material glued or otherwise affixed thereto, as shown in FIG. 36. Upon expansion of the central opening or fissure 75 into cylindrical shape, the insulating layers 77 and 78 will move outwardly with the expanding walls of the ribbon until the layers are formed into cylindrical shape against the inner periphery of the outer tubular cylindrical component 62, as shown in FIG. 37.

One important advantage of the technique described in connection with FIGS. 26–37 is that it permits the outer tubular component to be made as heavy as required independently of the inner tubular component, it may be made without rolling and/or reducing, as for example, by casting and it may even be made of material other than metal.

In the method of FIGS. 26–35, the width of the inner tubular component 69 in the flat ribbon condition shown in FIG. 32 is such, that the length of the outer perimeter of the walls of said component may be less than the length of the inner periphery of the inflated outer tubular component, so that the inner tubular component in S-shape when expanded in the outer tubular component will be spaced radially from the outer tubular component to form a jacket around the inner tubular component. If it is desired in accordance with certain aspects of the invention to apply an inner tubular component against the outer tubular component contiguously around substantially the entire circumference of the inner component without spacing, so that the inner tubular component serves as a lining for the outer tubular component, a technique similar to that described in connection with FIGS. 26–35 can be employed, except for the length of the flat ribbon 69 shown in FIG. 32. FIGS. 38–41 illustrate another embodiment of the process of the present invention to produce the lined tube described.

Figure 39:
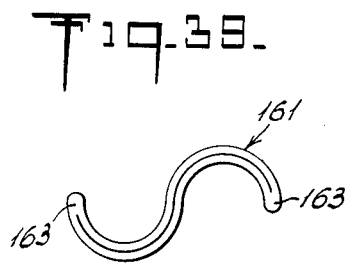
FIG. 39 is an end view of the ribbon of FIG. 38 after it has been bent in S-shape for insertion into an outer cylindrical tubular component.
Figure 40:
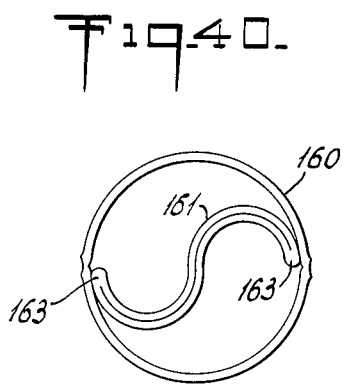
FIG. 40 is an end view of an outer cylindrical tubular component with the S-shaped ribbon of FIG. 39 inserted therein for assembly prior to the setting up of the lining for the outer tubular component.
Figure 41:
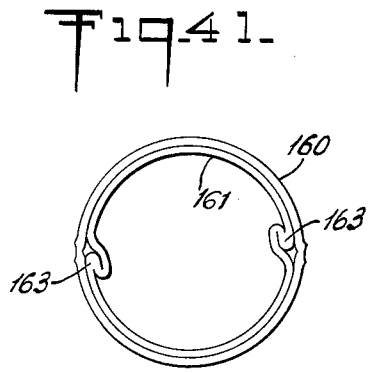
FIG. 41 is an end view of the lined tube after the S-shaped inner ribbon component of FIG. 40 has been fully inflated against the outer tubular component.

FIG. 41 shows the final lined tube produced by the process of FIGS. 38–41. This tube comprises an outer tubular cylindrical component 160 and an inner tubular substantially cylindrical component 161 contiguous thereto along substantially the entire outer periphery of said inner component to form a lining for the outer component. The outer tubular component 160 is similar to that shown in FIG. 29 and may be produced by steps similar to those illustrated in FIGS. 26–29, or the outer tubular component may be made by any other means, even by casting, and may even be an existing erected pipe installation, which is required to be lined.

The inner tubular component 161 is produced from the flat thin ribbon shown in FIG. 38, which in turn may be produced by the technique illustrated in FIGS. 30–32, the only difference being that the diameter of the blank of FIG. 30 is sufficiently larger to cause the bent ribbon produced therefrom to inflate into contact with the outer tubular component 160 around substantially the entire inner circumference thereof. For that purpose, the diameter of the blank is such, that the length of the opening or fissure 162 in the ribbon 161 of FIG. 38 is approximately equal to about one-half the inner perpibery of the outer tubular component 160, and actually may be slightly larger, depending on the thicknesses of the walls of the ribbon on the faces and sides, to insure that the bent ribbon when fully inflated will contact smoothly and continuously the inner periphery of the outer tubular component about substantially its entire perpibery except perhaps for some slight disengagements at the sides of the ribbon where the ribbon has been acutely folded. The required dimensions of the ribbon 161, of course, determines the dimensions of the cylindrical blank from which this ribbon is produced.

Since the cylindrical blank from which the ribbon 161 of FIG. 38 is produced is of uniform thickness, the thickness of the walls of the ribbon at the sides will remain equal substantially to the thickness of the cylindrical blank, while the thickness of the walls of the ribbon on the face of the ribbon will be reduced to the thickness of the walls of the final inflated inner tubular component in FIG. 41. The side sections 163 of the ribbon 161 beyond the ends of the center opening 162 will, therefore, form fins in the final inner tubular component inflated from the bent ribbon, as shown in FIG. 41, but these fins instead of extending radially from the inner tubular component to form an annular space between inner and outer tubular components, as shown in FIG. 35, flatten against the circular walls of the outer tubular component 160 due to the greater length of the ribbon.

The flat ribbon 161 shown in FIG. 38 is bent to bring the sides of the ribbon together to a distance sufficient to permit it to fit into the outer tubular component 160. Because the ribbon 161 is expanded into contact with the outer tubular component 160 along substantially the entire periphery of the outer tubular component, the specific shape of the ribbon may be important, depending on the ductility of the metal of the ribbon and the thinness of the ribbon, since a kink in the ribbon formed during the inflation thereof and pressed against the wall of the outer tubular component may not be straightened out when the ribbon is fully inflated. The ribbon 161 for that reason is desirably curvedly bent and free of sharp curves and is desirably shaped to permit the opposite face walls of the ribbon to separate smoothly and with substantial equilibrium during expansion. An S-shape for the ribbon is desirable for that purpose, and this shape is adopted in the embodiment of the invention herein, but as far as certain aspects of the invention are concerned, the ribbon may have any number of undulations and may even be trough-shape presenting a single continuous curvature from one side to the other, as for example, in semi-cylindrical shape.

The flat ribbon of FIG. 38 is bent into S-shape as described, with equal but reverse curves on opposite sides of its center, in the manner similar to that shown in FIG. 33, except that the reverse loops are deeper because of the greater width of the ribbon in the flat condition. The S-shaped ribbon of FIG. 39 is then inserted into the outer tubular component 160 with its ends desirably located in the regions of the internal creases of the outer tubular component 160, to retain the ribbon against rotary movement in the outer tubular component. If the outer tubular component 160 is not so creased, the S-shaped ribbon 161 and the inner tubular component formed therefrom may be held against rotation by any other means, in which case, the distance between the sides of the S-shaped ribbon need not be equal to the internal diameter of the outer tubular component 160 but may be less, or friction alone between the ribbon or the inner tubular component inflated therefrom and the outer tubular component can be utilized to retain the ribbon against rotation.

With the S-shaped ribbon 161 of FIG. 39 inserted into the outer tubular component 160 as shown in FIG. 40, this ribbon is inflated with enough fluid pressure, to cause the walls of the ribbon to conform and follow the inner periphery of the outer tubular component, and to bend the sides of the ribbon including the fins 163 acutely and flat against the outer tubular component. The inner tubular component 161 so produced forms a lining for the outer tubular component, which may be of metal different from that of the outer tubular component, and which may have non-corrosive or other desirable properties to protect the outer tubular component 160 against corrosion, chemical action, heat or other destructive elements, depending on the use.

The lining 161 produced by the process illustrated in FIGS. 38–41, since it is not bonded to the other tubular component 160, can be easily removed and replaced upon wear or damage of said lining.

Figure 42:
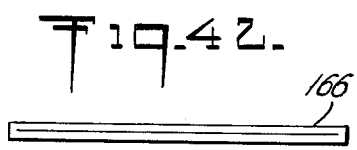
FIG. 42 is an end view of an inner tubular component in flat ribbon reduced form to be employed in producing a lined tube shown in FIG. 45 in accordance with another embodiment of the process of the present invention.
Figure 43:
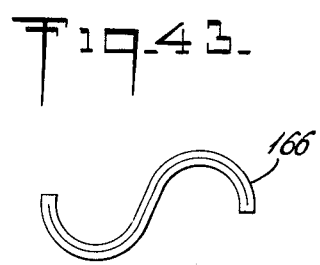
FIG. 43 is an end view of the ribbon of FIG. 42 after it has been bent in S-shape for insertion into an outer cylindrical tubular component.
Figure 44:
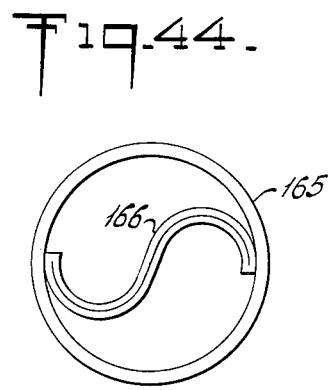
FIG. 44 is an end view of an outer cylindrical tubular component with the S-shaped ribbon of FIG. 43 inserted therein for assembly prior to the setting up of the lining for the outer tubular component.
Figure 45:
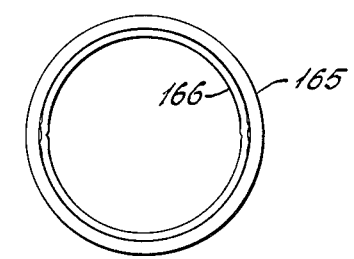
FIG. 45 is an end view of the lined tube after the S-shaped inner ribbon component in FIG. 44 has been fully inflated against the outer tubular component.

FIGS. 42–45 illustrate a modified form of process in which the inner tubular component, instead of being formed as a liner with flattened fins, as in the process of FIGS. 38–41, is formed free of such fins, as shown in FIG. 45. The lined tube of FIG. 45 comprises an outer cylindrical tubular component 165, shown having continuous inner and outer circular contours, free of creases or ridges, or cusps, and an inner tubular component 166, free of fins except for some slight ridges or cusps, in contiguous relationship with the outer tubular component around substantially the entire periphery of said inner component to form a liner therefor. The outer tubular component 165 may be a casting or a pipe formed by any process other than that illustrated in FIGS. 26–29, and the inner tubular component 166 may be produced from the flat thin ribbon shown in FIG. 42. The ribbon 166 may be produced by a technique following the steps illustrated in FIGS. 26–28, so that the walls at the sides of the ribbon are the same thickness as the walls at the faces and this thickness corresponds approximately to the desired thickness of the wall of the inner tubular component when fully inflated to form a liner, as shown in FIG. 45. To produce the ribbon of FIG. 42, the blank of FIG. 26 is dimensioned so that the thicknesses at the sides are substantially equal to the desired thickness of the wall of the inner tubular component when fully inflated. The dimensions of the blank from which the flat ribbon 166 of FIG. 42 is produced would be so selected, that the perimeter of the ribbon would be equal approximately to the internal circumference of the fully inflated tubular component in the final tube.

The flat ribbon 166 of FIG. 42 is then S-shaped, as shown in FIG. 43, to bring its opposite sides towards each other sufficiently to permit it to fit snugly at these sides into the outer tubular component 165. After the S-shaped ribbon has been so fitted into this outer component, as shown in FIG. 44, the ribbon 166 is subjected to internal fluid pressure to cause the ribbon to inflate against the outer tubular component 165 in continuous surface contact therewith substantially throughout the entire circumference of the inner component, to form an inner lining for said outer component.

In connection with all of the embodiments of the process of the present invention described, no reference has been made to the heating of the blank while it is being rolled and reduced into flat form and while it is being bent into S-shape for some of the embodiments. It must be understood that such heat might be employed to facilitate rolling and shaping, when the character of the metal employed requires it.

the component integrally therewith and extending therealong. These fins 70 extend radially into contact with the outer tubular component 62 and serve the same functions as they do in the construction of FIG. 8. As far as certain aspects of the invention are concerned, the outer tubular component 62 may be preformed in any suitable manner, but to assure the formation of a very thin component where such is required, it may be made by an extrusion, rolling and inflating operation. To that end, the outer tubular component blank 62 shown in FIG. 26 is extruded in partially flattened cross-sectionally elongated form with a pair of opposite face walls of uniform thickness converging and joined at the sides, so that the blank when compressed across its face walls will collapse towards a predetermined plane passing through the internal apices at the sides of the blank. The blank so formed, when pressed or rolled transversely of its opposite face walls and completely collapsed will assume the flat rectangular form shown in FIG. 27. This blank 62 before being collapsed is internally coated with a materials such as a heavy oil or other lubricant to prevent the opposed walls of the collapsed component to become bonded together, when the blank is rolled and reduced into ribbon form to be described, and to form an expansible closed opening or fissure 65 between these walls.

The dimension of the sides of the blank 62 in the form shown in FIG. 26 is such, that when the blank is completely collapsed into the form shown in FIG. 27, the thickness of the walls in the latter form between one end 63 of the opening 65 and the adjacent side 67 of the collapsed blank and between the other end 64 of the opening and the other side 66 of the collapsed blank is approximately equal to the thickness of the wall of the final fully inflated outer tubular component 62 shown in FIG. 35. The blank 62 completely collapsed into flat rectangular form shown in FIG. 27 is then rolled lengthwise of the blank into the thin ribbon form shown in FIG. 28 to reduce the thickness of the blank without reducing its width or other sidewise dimensions. The ribbon of FIG. 28 is then fully inflated, as for example, by water or other fluid under pressure into the circular form shown in FIG. 29.

For producing the inner tubular component 69, a cylindrical blank of substantially uniform thickness around its circumference is first formed, as shown in FIG. 30, preferably by extrusion. The cylindrical blank is internally coated with non-bonding material, such as heavy oil, is collapsed by rolling or pressing into the flat shape shown in FIG. 31 and is reduced by rolling in a lengthwise direction without substantially altering its sidewise dimensions, to form the thin flat ribbon 69 shown in FIG. 32, with an unbonded closed opening or fissure 75. The ribbon 69 of FIG. 32 in its flat state is too wide to fit into the outer tubular component 62 but is transversely bent into crooked shape shown in FIG. 33 to bring its sides 72 73 together to a distance equal to or less than the internal diameter of the outer tubular component 62 shown in FIG. 29 to permit said ribbon to fit into said outer tubular component. The ribbon 69 is bent in such shape as to permit it to be expanded smoothly with balance and equilibrium, so as to not to produce kinks therein, and for that purpose, is formed as shown in FIG. 33 into an S-shape cross-section with similar reversed loops, as for example, by progressive roll-forming or by other means which do not affect the dimensions of the ribbons.

The outer tubular component 62 may be stored and/or shipped in the flat ribbon form shown in FIG. 28 and the inner tubular component 69 may also be stored and/or shipped in the flat form shown in FIG. 32 or in the crooked ribbon form shown in FIG. 33.

When the double-walled tube is to be set up, the S-shaped inner tubular component 69 of FIG. 33 is inserted into the outer tubular component 62 of FIG. 29 to form the assembly shown in FIG. 34. The ribbon is so shaped and dimensioned that its ends 72 and 73 will be at diametrically opposite sides of the inner periphery of the inflated outer tubular component 62. The creases produced at the diametrically opposite sides of the fully inflated outer tubular component 69 by the folds at the ends of the opening 65 of the ribbon of FIG. 28 serve as anchoring points for the ends of the inner tubular component 69 in the outer tubular component, as shown in FIG. 34. The inner tubular component 69 so shaped and located is then inflated by fluid pressure into the cylindrical shape to form the double-walled tube of FIG. 35.

By considering the fact that rolling to reduce the thickness of the collapsed components 62 and 69 does not alter substantially the sidewise dimensions and by selecting the proper dimensions of the components in the blank forms shown in FIGS. 26 and 30, the formation of the tube shown in FIG. 35 with cylindrical concentric components 62 and 69 and with the radial spacer fins 70 extending to the outer tubular component 62 is assured, as described in connection with the form of the invention illustrated in FIGS. 1–8.

In the embodiment of the invention shown in FIGS. 26–35, the double-walled tube produced has its annular space 76 between the inner and outer tubular components 62 and 69 clear to hold dead air or other fluid or to serve as a passageway for a heat-exchange fluid. In the embodiment of the invention shown in FIGS. 36 and 37, the double-walled tube is produced with solid insulating material 77 and 78 filling the annular space 76. To that end, the S-shaped ribbon 69 of FIG. 33 is conformably covered on its opposite sides with two layers 77 and 78 of insulating material glued or otherwise affixed thereto, as shown in FIG. 36. Upon expansion of the central opening or fissure 75 into cylindrical shape, the insulating layers 77 and 78 will move outwardly with the expanding walls of the ribbon until the layers are formed into cylindrical shape against the inner periphery of the outer tubular cylindrical component 62, as shown in FIG. 37.

One important advantage of the technique described in connection with FIGS. 26–37 is that it permits the outer tubular component to be made as heavy as required independently of the inner tubular component, it may be made without rolling and/or reducing, as for example, by casting and it may even be made of material other than metal.

In the method of FIGS. 26–35, the width of the inner tubular component 69 in the flat ribbon condition shown in FIG. 32 is such, that the length of the outer perimeter of the walls of said component may be less than the length of the inner periphery of the inflated outer tubular component, so that the inner tubular component in S-shape when expanded in the outer tubular component will be spaced radially from the outer tubular component to form a jacket around the inner tubular component. If it is desired in accordance with certain aspects of the invention to apply an inner tubular component against the outer tubular component contiguously around substantially the entire circumference of the inner component without spacing, so that the inner tubular component serves as a lining for the outer tubular component, a technique similar to that described in connection with FIGS. 26–35 can be employed, except for the length of the flat ribbon 69 shown in FIG. 32. FIGS. 38–41 illustrate another embodiment of the process of the present invention to produce the lined tube described.

FIG. 41 shows the final lined tube produced by the process of FIGS. 38–41. This tube comprises an outer tubular cylindrical component 160 and an inner tubular substantially cylindrical component 161 contiguous thereto along substantially the entire outer periphery of said inner component to form a lining for the outer component. The outer tubular component 160 is similar to that shown in FIG. 29 and may be produced by steps similar to those illustrated in FIGS. 26–29, or the outer tubular component may be made by any other means, even by casting, and may even be an existing erected pipe installation, which is required to be lined.

The inner tubular component 161 is produced from the flat thin ribbon shown in FIG. 38, which in turn may be produced by the technique illustrated in FIGS. 30-32, the only difference being that the diameter of the blank of FIG. 30 is sufficiently larger to cause the bent ribbon produced therefrom to inflate into contact with the outer tubular component 160 around substantially the entire inner circumference thereof. For that purpose, the diameter of the blank is such, that the length of the opening or fissure 162 in the ribbon 161 of FIG. 38 is approximately equal to about one-half the inner perpihery of the outer tubular component 160, and actually may be slightly larger, depending on the thicknesses of the walls of the ribbon on the faces and sides, to insure that the bent ribbon when fully inflated will contact smoothly and continuously the inner periphery of the outer tubular component about substantially its entire perpihery except perhaps for some slight disengagements at the sides of the ribbon where the ribbon has been acutely folded. The required dimensions of the ribbon 161, of course, determines the dimensions of the cylindrical blank from which this ribbon is produced.

Since the cylindrical blank from which the ribbon 161 of FIG. 38 is produced is of uniform thickness, the thickness of the walls of the ribbon at the sides will remain equal substantially to the thickness of the cylindrical blank, while the thickness of the walls of the ribbon on the face of the ribbon will be reduced to the thickness of the walls of the final inflated inner tubular component in FIG. 41. The side sections 163 of the ribbon 161 beyond the ends of the center opening 162 will, therefore, form fins in the final inner tubular component inflated from the bent ribbon, as shown in FIG. 41, but these fins instead of extending radially from the inner tubular component to form an annular space between inner and outer tubular components, as shown in FIG. 35, flatten against the circular walls of the outer tubular component 160 due to the greater length of the ribbon.

The flat ribbon 161 shown in FIG. 38 is bent to bring the sides of the ribbon together to a distance sufficient to permit it to fit into the outer tubular component 160. Because the ribbon 161 is expanded into contact with the outer tubular component 160 along substantially the entire periphery of the outer tubular component, the specific shape of the ribbon may be important, depending on the ductility of the metal of the ribbon and the thinness of the ribbon, since a kink in the ribbon formed during the inflation thereof and pressed against the wall of the outer tubular component may not be straightened out when the ribbon is fully inflated. The ribbon 161 for that reason is desirably curvedly bent and free of sharp curves and is desirably shaped to permit the opposite face walls of the ribbon to separate smoothly and with substantial equilibrium during expansion. An S-shape for the ribbon is desirable for that purpose, and this shape is adopted in the embodiment of the invention herein, but as far as certain aspects of the invention are concerned, the ribbon may have any number of undulations and may even be trough-shape presenting a single continuous curvature from one side to the other, as for example, in semi-cylindrical shape.

The flat ribbon of FIG. 38 is bent into S-shape as described, with equal but reverse curves on opposite sides of its center, in the manner similar to that shown in FIG. 33, except that the reverse loops are deeper because of the greater width of the ribbon in the flat condition. The S-shaped ribbon of FIG. 39 is then inserted into the outer tubular component 160 with its ends desirably located in the regions of the internal creases of the outer tubular component 160, to retain the ribbon against rotary movement in the outer tubular component. If the outer tubular component 160 is not so creased, the S-shaped ribbon 161 and the inner tubular component formed therefrom may be held against rotation by any other means, in which case, the distance between the sides of the S-shaped ribbon need not be equal to the internal diameter of the outer tubular component 160 but may be less, or friction alone between the ribbon or the inner tubular component inflated therefrom and the outer tubular component can be utilized to retain the ribbon against rotation.

With the S-shaped ribbon 161 of FIG. 39 inserted into the outer tubular component 160 as shown in FIG. 40, this ribbon is inflated with enough fluid pressure, to cause the walls of the ribbon to conform and follow the inner periphery of the outer tubular component, and to bend the sides of the ribbon including the fins 163 acutely and flat against the outer tubular component. The inner tubular component 161 so produced forms a lining for the outer tubular component, which may be of metal different from that of the outer tubular component, and which may have non-corrosive or other desirable properties to protect the outer tubular component 160 against corrosion, chemical action, heat or other destructive elements, depending on the use.

The lining 161 produced by the process illustrated in FIGS. 38-41, since it is not bonded to the other tubular component 160, can be easily removed and replaced upon wear or damage of said lining.

FIGS. 42-45 illustrate a modified form of process in which the inner tubular component, instead of being formed as a liner with flattened fins, as in the process of FIGS. 38-41, is formed free of such fins, as shown in FIG. 45. The lined tube of FIG. 45 comprises an outer cylindrical tubular component 165, shown having continuous inner and outer circular contours, free of creases or ridges, or cusps, and an inner tubular component 166, free of fins except for some slight ridges or cusps, in contiguous relationship with the outer tubular component around substantially the entire periphery of said inner component to form a liner therefor. The outer tubular component 165 may be a casting or a pipe formed by any process other than that illustrated in FIGS. 26-29, and the inner tubular component 166 may be produced from the flat thin ribbon shown in FIG. 42. The ribbon 166 may be produced by a technique following the steps illustrated in FIGS. 26-28, so that the walls at the sides of the ribbon are the same thickness as the walls at the faces and this thickness corresponds approximately to the desired thickness of the wall of the inner tubular component when fully inflated to form a liner, as shown in FIG. 45. To produce the ribbon of FIG. 42, the blank of FIG. 26 is dimensioned so that the thicknesses at the sides are substantially equal to the desired thickness of the wall of the inner tubular component when fully inflated. The dimensions of the blank from which the flat ribbon 166 of FIG. 42 is produced would be so selected, that the perimeter of the ribbon would be equal approximately to the internal circumference of the fully inflated tubular component in the final tube.

The flat ribbon 166 of FIG. 42 is then S-shaped, as shown in FIG. 43, to bring its opposite sides towards each other sufficiently to permit it to fit snugly at these sides into the outer tubular component 165. After the S-shaped ribbon has been so fitted into this outer component, as shown in FIG. 44, the ribbon 166 is subjected to internal fluid pressure to cause the ribbon to inflate against the outer tubular component 165 in continuous surface contact therewith substantially throughout the entire circumference of the inner component, to form an inner lining for said outer component.

In connection with all of the embodiments of the process of the present invention described, no reference has been made to the heating of the blank while it is being rolled and reduced into flat form and while it is being bent into S-shape for some of the embodiments. It must be understood that such heat might be employed to facilitate rolling and shaping, when the character of the metal employed requires it.

While the invention has been described with particular reference to specific embodiments, it is to be understood that it is not to be limited thereto but is to be construed broadly and restricted solely by the scope of the appended claim.

What is claimed is:

A method of producing a double-walled tube having an inner tubular component and an outer tubular component, which comprises forming a tubular member in the collapsed form of a ribbon bent into S-shaped cross-section to bring its sides closer together without forming folds in face to face contact, the thickness of the face wall sections of said tubular member being approximately equal to the desired thickness of the inner tubular component of the tube to be produced, while the thickness of the side wall sections of said tubular member is greater than the desired thickness of the inner tubular component of the tube to be produced, said ribbon being faced with layers of insulating material, inserting said ribbon into the outer tubular component, and inflating said ribbon to form the inner tubular component, said ribbon being so dimensioned that when fully inflated, its outer periphery will be separated from the outer periphery of the outer tubular component by an annular space with said layers contained in said space, and the side sections of said ribbon will form fins radiating outwardly from said inner tubular component towards said outer tubular component and will be closely adjacent to the inner periphery of said outer tubular component.

References Cited by the Examiner

UNITED STATES PATENTS

| | | |
|---|---|---|
| 146,868 | 1/74 | Brooks. |
| 377,317 | 1/88 | Marshall. |
| 830,695 | 9/06 | Witzenmann. |
| 942,184 | 12/09 | Persons _____ 29—421 |
| 1,677,714 | 7/28 | Frease _____ 257—246 |
| 1,852,489 | 4/32 | Sullivan _____ 257—246 |
| 2,188,133 | 1/40 | Hepburn _____ 257—246 |
| 2,263,714 | 11/41 | Bloomfield et al. _____ 29—523 |
| 2,453,165 | 11/48 | Thornburgh _____ 29—548 |
| 2,611,585 | 9/52 | Boling. |
| 2,633,414 | 3/53 | Boivinet _____ 29—523 X |
| 2,693,026 | 11/54 | Simpelaar _____ 29—157.3 |
| 2,703,921 | 3/55 | Brown _____ 29—157.3 |
| 2,707,820 | 5/55 | Reynolds _____ 29—421 |
| 2,850,796 | 9/58 | Kaplowitz et al. _____ 29—421 |
| 2,987,810 | 6/61 | Campbell _____ 29—421 |

FOREIGN PATENTS

| | | |
|---|---|---|
| 205,695 | 1/57 | Australia. |
| 1,157,173 | 5/58 | France. |
| 823,864 | 12/51 | Germany. |
| 7,990 | 1897 | Great Britain. |
| 190,585 | 12/22 | Great Britain. |

WHITMORE A. WILTZ, *Primary Examiner.*

HERMAN BERMAN, JOHN F. CAMPBELL,
*Examiners.*